United States Patent [19]

Pfenning et al.

[11] 3,757,625
[45] Sept. 11, 1973

[54] APPARATUS FOR MAKING ENGINEERING STAKES

[76] Inventors: Ray C. Pfenning, No. 2 Terrace Dr.; James E. Caton, P.O. Box 807, both of Helena, Ark.

[22] Filed: Nov. 12, 1971

[21] Appl. No.: 198,359

[52] U.S. Cl. .................. 83/404.1, 83/422, 83/432, 83/435.2, 144/30
[51] Int. Cl. ...... B27b 25/04, B27m 3/00, B27b 5/04
[58] Field of Search ................. 143/38 R, 36, 49 R; 144/30; 83/404.1, 422, 435.2, 471.3, 486.1

[56] References Cited
UNITED STATES PATENTS

| | | | |
|---|---|---|---|
| 3,388,727 | 6/1966 | Kotila | 143/38 |
| 3,662,795 | 5/1972 | Heflin | 143/39 |
| 1,211,974 | 1/1917 | Smart | 144/30 |

*Primary Examiner*—Donald R. Schran
*Attorney*—Carlton Hill et al.

[57] ABSTRACT

A continuous apparatus for cutting workpieces at different angles including a conveyor with flights thereon which deliver a plurality of workpieces in side-by-side relation to a cutting station, clamping means which engage the workpieces while advancing into the cutting station to hold the same against vertical displacement, and a pair of rotary power saws disposed in sequence in the cutting station with their blades in different angular planes for sequentially cutting the workpieces at different angles. Safety means are provided to enclose the chain and the power saws, with adjustment means being provided in front of the guards to permit angular adjustment of the axis of the power saws from a location remote from the saws.

4 Claims, 5 Drawing Figures

APPARATUS FOR MAKING ENGINEERING STAKES

BACKGROUND OF THE INVENTION

1. Field of the Invention

This invention is in the field of continuous apparatus for cutting wood and the like and provides a substantially foolproof, danger-free assembly for continuously cutting the workpieces and providing for safe adjustment of the angularity of the power saws when that becomes necessary or desirable.

2. Description of the Prior Art

Numerous examples of continuous sawing machines in the prior art include a conveyor which delivers the workpieces to be cut to the cutting station where the workpieces are acted upon by motor driven power saws. For the most part, however, these installations require operation by relatively skilled workers and require that the workers utilize a high degree of care to avoid possible injury. Particularly dangerous situations are encountered where the operator has open access to the blade of the power saw. Additional difficulties are presented in the event the angle of cut must be changed during the cutting operation since such machines frequrntly do not provide for an automatic deenergization of the system when the angular position of the saw is being changed, raising the possibility of severe injury occurring.

SUMMARY OF THE INVENTION

This invention provides a conveyorized apparatus for cutting workpieces at different angles, the operation being completely automatic and capable of being operated by personnel having physical handicaps or being mentally retarded. Guard means are provided about the conveyor to prevent the possibility of catching the operator's hands or clothing, and the cutting saws are located in a position where they are inaccessible by direct contact from either the front or back. Adjustment means are provided in front of the guard means to enable the operator to periodically adjust the angle of cut of both saws. Specifically, the invention includes a combination of a conveyor, the conveyor having a plurality of flights thereon which serve to position and convey a plurality of workpieces in side-by-side relation to a cutting station where they are engaged by clamping means positioned in the cutting area to engage the workpieces while the workpieces advance into the cutting station. While held against vertical displacement, the workpieces are acted upon by a pair of rotary power saws disposed in sequence in the cutting station with their blades in different angular planes for sequentially cutting the workpiece at different angles.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 5 is a plan view of an engineering stake which can conveniently be processed by the equipment of the present invention.

DESCRIPTION OF THE PREFERRED EMBODIMENTS

Figure 1:
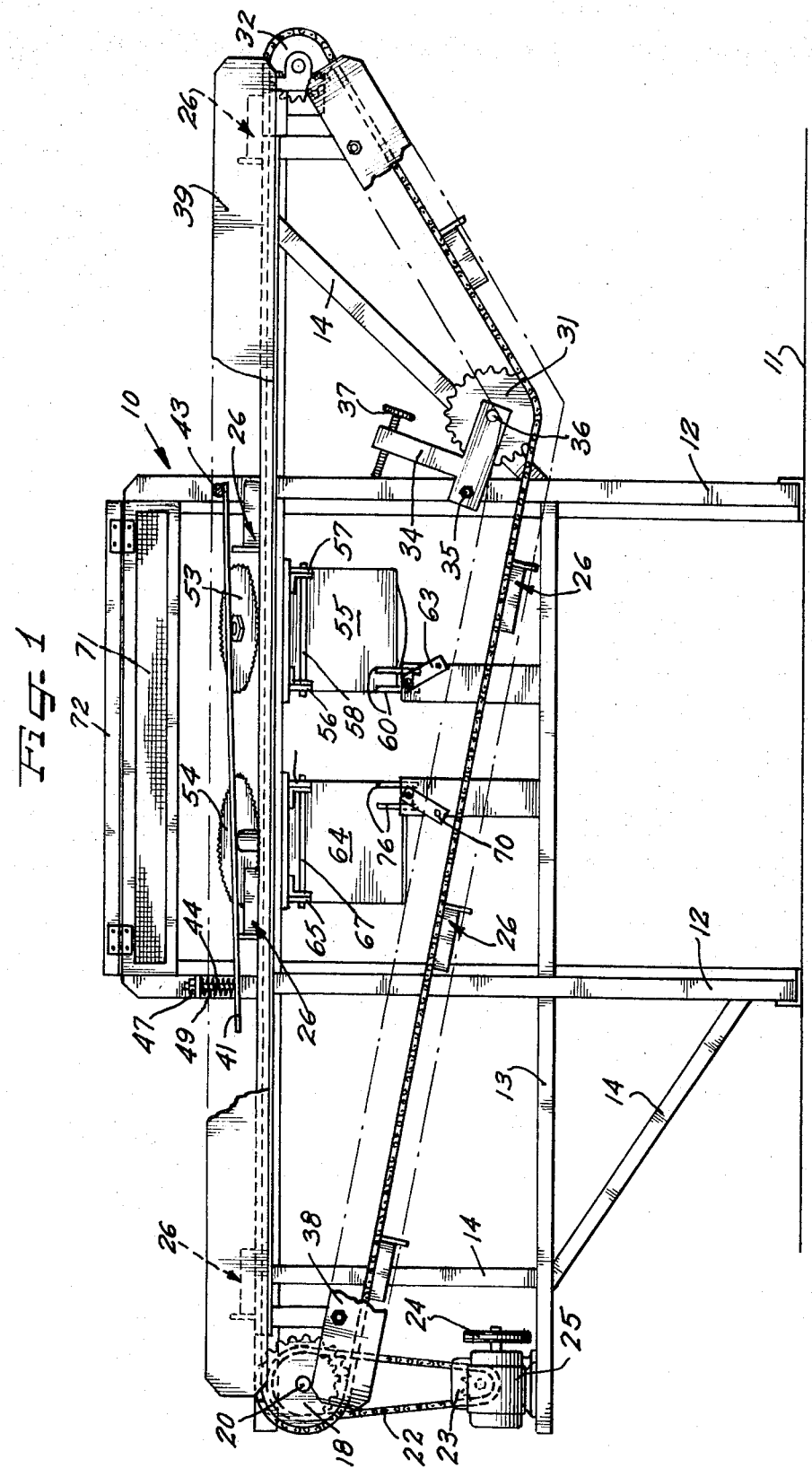
FIG. 1 is a view in elevation, partly broken away for purposes of illustration, of the machine.

In FIG. 1, reference numeral 10 indicates generally a frame structure resting on a floor 11 including legs 12, horizontal supports 13, braces 14 and an inverted channel member 15 which defines the upper horizontal surface along which the workpieces are conveyed. A pair of conveyor chains 16 and 17 are positioned on either side of the channel member 15. The chains 16 and 17 are driven by means of sprockets 18 and 19, respectively, the two sprockets being connected together by means of a shaft 20. The shaft 20, in turn, is driven from a sprocket 21 connected by means of a chain 22 to a speed reducing gear box 23. A V-belt 24 transmits driving power to the gear box 23 from a motor 25.

Figure 2:
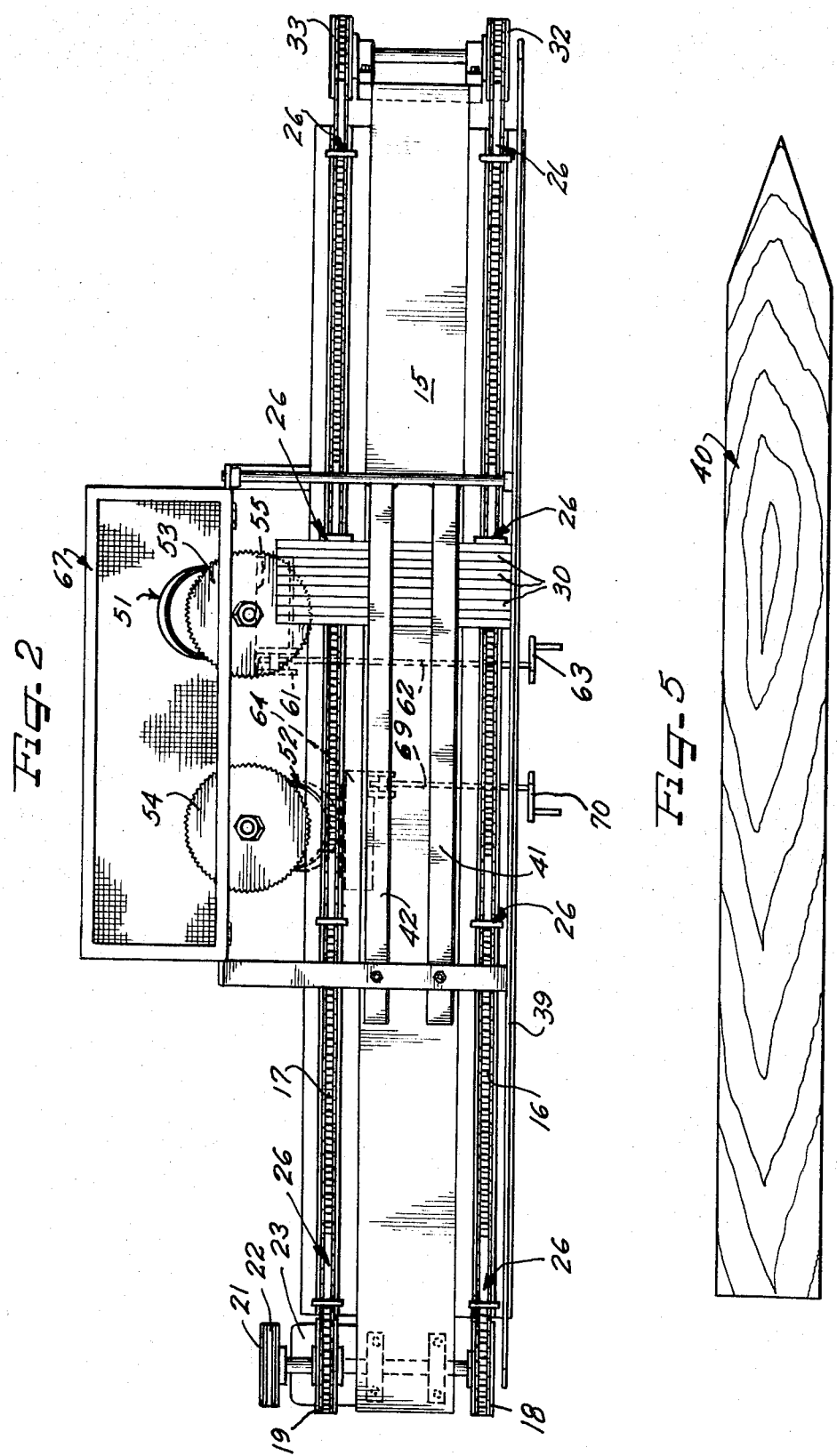
FIG. 2 is a plan view of the assembly shown in FIG. 1.
Figure 4:
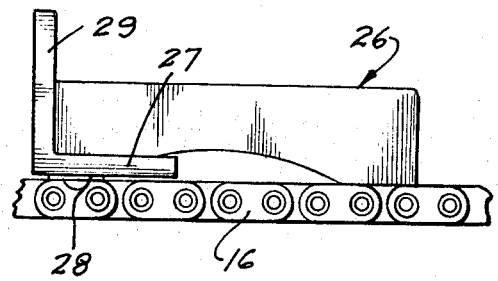
FIG. 4 is an enlarged view in elevation of one of the flights on the conveyor chain.

Each of the conveyor chains 16 and 17 have secured to it a plurality of spaced flights 26, the construction of which is best illustrated in FIG. 4 of the drawings. Each flight 26 has a base portion 27 secured to the chain by means of a fastening means 28. It also has a vertically standing portion 29 which serves as a stop for positioning a plurality of workpieces 30 in passing through the cutting zone, as best illustrated in FIG. 2. From the same figure, it will be evident that the flights 26 on the chains 16 and 17 are in parallel alignment so that the workpieces 30 are propelled into the cutting zone perpendicular to the direction of movement of the conveyor.

To complete the description of the conveying system, the chains 16 and 17 pass over idler sprockets 31 and then over sprockets 32 and 33 located at the delivery end of the machine. Tension on the chains can be adjusted by means of a bracekt 34 which is pivotally secured to one of the legs 12 by means of a pivot pin 35, the bracket 34 having a stub shaft 36 about which the idler sprocket 31 is received. An adjusting screw 37 operates against one of the legs 12 to move the idler sprocket 31 about the pivot pin 35 and thereby changes the tension on the chain which it engages.

To protect the operator from accidental contact with the conveyor, a guard rail 38 is provided in front of the chain 16 along the entire bottom run of the chain, and an upper guard rail 39 is provided along the upper run of the conveyor.

Figure 3:
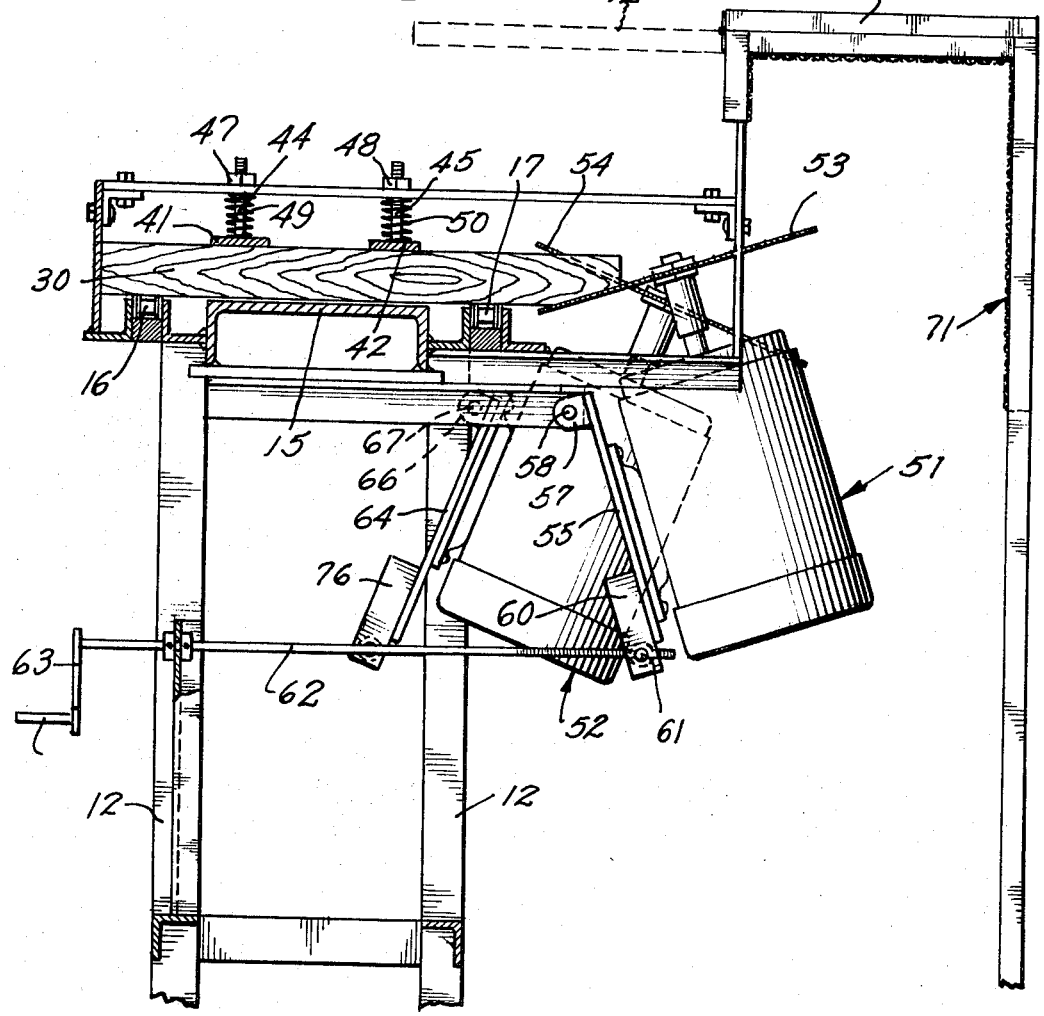
FIG. 3 is a view partly in elevation and partly in cross-section of the cutting station.

The particular machine shown in the drawings is intended to cut pieces of wood into the form of pointed engineering stakes 40, one of which is illustrated in FIG. 5. Accordingly, the workpieces 30 are placed at the delivery end of the conveyor which is the right end as viewed in FIGS. 1 and 2 in side-by-side relationship, the long dimension of the pieces 30 being horizontal, and the width dimension being vertical. As the flights 26 propel the workpieces 30 into the cutting station, the pieces engage a clamping means formed by means of a pair of bars 41 and 42 which are pivotally supported by being secured to a rotatable rod 43 journaled for rotation between two of the legs 12. Near the opposite ends of the bars 41 and 42 are secured threaded rods 44 and 45 which pass through a crossbar 46 as best illustrated in FIG. 3. Nuts 47 and 48 are provided on the threaded end portions of the rods 44 and 45 to limit the extent of movement of the bars 41 and 42. A pair of coil springs 49 and 50 resiliently urge the ends of the bars 41 and 42 downwardly as best seen in FIG. 1 of the drawings. Consequently, when a plurality of the workpieces 30 advances into the cutting station, the bars 41 and 42 will engage the upper surfaces thereof causing the bars 41 and 42 to move upwardly against the bias provided by the springs 49 and 50. The downward pressure on the workpieces, however, is sufficient so that it prevents the upward movement of the workpieces at the time the cutting operation is being carried out.

In forming the engineering stakes 40, the workpieces 30 are subjected to two cutting operations from a pair of rotary power saws 51 and 52 having their saw blades 53 and 54, respectively, disposed at differing angles to the vertical, as best seen in FIG. 3. The saw blade 53 is positioned to initially cut the workpieces 30 at an angle to the lower edge, and the subsequent cut by the saw blade 54 cuts the upper corner off the workpieces to provide the pointed end portion. The power saw 51 is secured to a plate 55, the plate having a pair of brackets 56 and 57 through which a shaft 58 is journaled for rotation. The plate 55 has a pair of ears 60,60 carrying a trunnion 61. A shaft 62 is threaded into the trunnion 61, so that rotation of a hand operated crank 63 is effective to pivot the motor 51 about the shaft 58 and thereby change the angular position of the motor 51. Similarly, the power saw 52 is suported on a plate 64 between a pair of brackets 66,66 and is pivoted about a shaft 67 extending therebetween. A trunnion 68 carried by the plate 64 receives a threaded shaft 69 operated by a hand operated crank 70. Both cranks 63 and 70 are located forwardly of the guard rail 38 so that incremental adjustment of the blade angles of the saws 51 and 52 can be made from a position well removed from the saws themselves.

The cutting station is further protected against accidental contact by providing a cage 71 about the saw blades, the cage being composed of wire mesh or expanded metal lath. To protect further against possible inadvertent contact with the cutting area, the cage 71 is provided with a hingedly supported cover 72 which may be folded over into the dotted line position shown in FIG. 3 so that there is no possibility of an operator's hands coming anywhere near the power saws.

The operation of the machine should be evident from what has been said in the preceding description. The operator merely has to stack a number of workpieces on end in side-by-side relationship against the barrier provided by the flights 26. The pieces are then automatically moved into the cutting zone where they are held against vertical movement by the action of the clamping bars 41 and 42. The first saw blade 53 then cuts off the lower corner of the array of workpieces, and the second saw blade 54 cuts off the upper corner. The workpieces then pass out of the cutting zone and under the bars 41 and 42, the bias of the springs 49 and 50 being insufficient to prevent such movement. If adjustment is required, it can be easily accomplished by manipulating the hand cranks 63 and 70 from a position well remote from the saws themselves.

There is thus provided in accordance with this invention a stake saw constituting an apparatus which can be safely operated by workers requiring sheltered employment, for example, the mentally retarded, physically handicapped, emotionally disturbed or socially deprived. Such operators are only about 40 percent productive compared to the norms of industry.

Because of the safety features embodied in the machine of this invention, even a blind person can operate it successfully in complete safety and produce engineering stakes at a high rate of productivity.

Although minor modifications might be suggested by those versed in the art, it should be understood that we wish to embody within the scope of the patent warranted hereon all such modifications as reasonably and properly come within the scope of our contribution to the art.

We claim as our invention:

1. A continuous apparatus for cutting workpieces at different angles which comprises a conveyor means, a plurality of flights on said conveyor means for delivering a plurality of workpieces in side-by-side relation to a clamping means station, clamping means engageable by said plurality of workpieces while advancing into said cutting station to hold said workpieces in clamped relation, said clamping means including a pair of bars pivotally mounted at one end and having spring means at the opposite end applying a downward pressure on the workpieces in said cutting station, and a pair of rotary power saws disposed in sequence in said cutting station with their blades in different angular planes for sequentially cutting said workpiece at said different angular planes for sequentially cutting said workpiece at said different angles.

2. The apparatus of claim 1 which includes adjustment means for adjusting the angular axis of each of said saws from positions remote from each of said saws.

3. The apparatus of claim 2 in which said conveyor means consists of a continuous chain, and includes a guard positioned forwardly of said chain, said adjustment means extending forwardly of said guard.

4. The apparatus of claim 3 in which said adjustment means includes a crank which upon rotation pivots the power saw with respect to its support.

* * * * *